(12) United States Patent
Rudd et al.

(10) Patent No.: US 9,561,559 B2
(45) Date of Patent: Feb. 7, 2017

(54) METHOD AND MACHINE FOR FORGE WELDING OF TUBULAR ARTICLES AND EXOTHERMIC FLUX MIXTURE AND METHOD OF MANUFACTURING AN EXOTHERMIC FLUX MIXTURE

(71) Applicant: Tubefuse Applications B.V., The Hague (NL)

(72) Inventors: Wayne Rudd; Hu Chun Yi, Lakewood, CO (US); Jeremy Joseph Iten, Littleton, CO (US)

(73) Assignee: TUBEFUSE APPLICATIONS B.V., The Hague (NL)

( * ) Notice: Subject to any disclaimer, the term of this patent is extended or adjusted under 35 U.S.C. 154(b) by 55 days.

(21) Appl. No.: 14/380,146

(22) PCT Filed: Feb. 22, 2013

(86) PCT No.: PCT/EP2013/053611
§ 371 (c)(1),
(2) Date: Aug. 21, 2014

(87) PCT Pub. No.: WO2013/124447
PCT Pub. Date: Aug. 29, 2013

(65) Prior Publication Data
US 2015/0021377 A1    Jan. 22, 2015

(30) Foreign Application Priority Data

Feb. 22, 2012   (GB) .................................. 1203030.0

(51) Int. Cl.
*B23K 20/12*    (2006.01)
*B23K 20/16*    (2006.01)
(Continued)

(52) U.S. Cl.
CPC ........... *B23K 20/165* (2013.01); *B23K 20/002* (2013.01); *B23K 20/023* (2013.01); *B23K 20/028* (2013.01);
(Continued)

(58) Field of Classification Search
CPC ..... B23K 1/0006; B23K 20/00; B23K 20/165; B23K 2201/06; B23K 35/34; B23K 13/025; B23K 20/08; B23K 35/0233; C06B 21/0083; C06B 45/14; C06B 45/12
(Continued)

(56) References Cited

U.S. PATENT DOCUMENTS

| 1,260,690 A | 3/1918 | Liady |
| 2,497,631 A | 2/1950 | Rothschild |

(Continued)

FOREIGN PATENT DOCUMENTS

| DE | 368246 A | 2/1923 |
| EP | 0238758 A2 | 9/1987 |

(Continued)

OTHER PUBLICATIONS

WO2008009670A computer english translation.*
(Continued)

*Primary Examiner* — Erin Saad
(74) *Attorney, Agent, or Firm* — Perkins IP Law Group LLC; Jefferson Perkins

(57) ABSTRACT

A method of forge welding includes placing at least two components for welding together, adjacent each other and with an exothermic flux mixture placed between the components. The exothermic flux mixture is heated to initiate an exothermic reaction and the faying surfaces of the two components are pressed together. The components being welded may be tubular, in particular pipes. Apparatus for the
(Continued)

method of forge welding and exothermic flux mixtures for the method of forge welding are also provided.

20 Claims, 6 Drawing Sheets

(51) Int. Cl.
*B23K 35/362* (2006.01)
*B23K 20/02* (2006.01)
*B23K 35/36* (2006.01)
*B23K 35/02* (2006.01)
*B23K 20/00* (2006.01)
*B23K 37/00* (2006.01)

(52) U.S. Cl.
CPC .......... *B23K 35/02* (2013.01); *B23K 35/0244* (2013.01); *B23K 35/362* (2013.01); *B23K 35/3602* (2013.01); *B23K 35/3603* (2013.01); *B23K 35/3606* (2013.01); *B23K 37/003* (2013.01); *B23K 2201/04* (2013.01)

(58) Field of Classification Search
USPC ................................ 228/112.1, 113, 114, 2.1
See application file for complete search history.

(56) References Cited

U.S. PATENT DOCUMENTS

| | | | |
|---|---|---|---|
| 2,604,569 A | 7/1952 | Denneen | |
| 2,649,527 A | 8/1953 | Chapman et al. | |
| 2,660,199 A | 11/1953 | Montgomery | |
| 2,719,207 A | 9/1955 | Moyer | |
| 2,805,316 A | 9/1957 | Chapman | |
| 2,892,914 A | 6/1959 | Rudd | |
| 2,998,646 A | 9/1961 | Hitz | |
| 3,065,536 A | 11/1962 | Chapman | |
| 3,567,527 A | 3/1971 | Pevar | |
| 3,890,168 A | 6/1975 | Shumway | |
| 3,941,299 A | 3/1976 | Godfrey | |
| 4,152,568 A | 5/1979 | Yamaguchi et al. | |
| 4,339,483 A | 7/1982 | Ueno et al. | |
| 4,384,657 A | 5/1983 | Ueno et al. | |
| 4,535,215 A | 8/1985 | Kliesch et al. | |
| 4,566,625 A | 1/1986 | Moe | |
| 4,669,650 A | 6/1987 | Moe | |
| 4,728,760 A | 3/1988 | Brolin et al. | |
| 4,736,084 A | 4/1988 | Moe | |
| 4,947,462 A | 8/1990 | Moe | |
| 5,009,737 A | 4/1991 | Lescaut | |
| 5,163,604 A | 11/1992 | Moe | |
| 5,435,478 A | 7/1995 | Wood et al. | |
| 5,686,002 A | 11/1997 | Flood et al. | |
| 5,721,413 A | 2/1998 | Moe | |
| 5,924,745 A | 7/1999 | Campbell | |
| 6,078,031 A | 6/2000 | Bliault et al. | |
| 6,378,760 B1 | 4/2002 | Shimizu et al. | |
| 6,534,194 B2 * | 3/2003 | Weihs ................. | B23K 1/0006 228/107 |
| 7,181,821 B2 | 2/2007 | Anderson et al. | |
| 2002/0014514 A1 | 2/2002 | Shimizu et al. | |
| 2006/0219759 A1 | 10/2006 | Duckham et al. | |
| 2007/0158390 A1 | 7/2007 | Anderson et al. | |
| 2011/0168693 A1 | 7/2011 | Rudd et al. | |
| 2011/0299800 A1 | 12/2011 | Seufert et al. | |

FOREIGN PATENT DOCUMENTS

| | | |
|---|---|---|
| EP | 0287429 A | 10/1988 |
| EP | 0543437 A1 | 5/1993 |
| EP | 1078709 A2 | 2/2001 |
| EP | 1167852 A2 | 2/2002 |
| GB | 793402 A | 4/1958 |
| GB | 835787 A | 5/1960 |
| GB | 1203942 A | 9/1970 |
| GB | 1552660 A | 9/1979 |
| JP | 53-53561 A | 5/1978 |
| JP | 57-50214 A | 3/1982 |
| JP | S61-49789 A | 3/1986 |
| JP | H3-243286 A | 10/1991 |
| JP | H7-24577 A | 1/1995 |
| JP | 2001009576 A | 1/2001 |
| WO | 9833619 A | 8/1998 |
| WO | 0230611 A1 | 4/2002 |
| WO | 03064095 A2 | 8/2003 |
| WO | 2004007135 A1 | 1/2004 |
| WO | 2004007139 A1 | 1/2004 |
| WO | 2004010163 A1 | 1/2004 |
| WO | 2008009670 A | 1/2008 |
| WO | 2008009670 A1 | 1/2008 |
| WO | 2010046666 A2 | 4/2010 |

OTHER PUBLICATIONS

Wikipedia, Calcium silicide, downloaded from http://en.wikipedia.org/wiki/Calcium_silicide on Jun. 29, 2011.
Schwartz, B., "Thermite Welding," ASM Handbook, vol. 6, "Welding, Brazing, and Soldering," ASM International, 2007.
Calvert, J.B., Flash! Bang! Whiz!, downloaded from http://mysite.du.edu/~jcalvert/phys/bang.htm on Jul. 6, 2011.
Erico International Corporation, Material Safety Data Sheet prepared for CADWELD Electrical Welding Material on Mar. 1, 2007.
European Patent Office as ISA, International Search Report issued on Patent Application No. PCT/GB2009/002541 on Aug. 20, 2010.
European Patent Office as ISA, International Search Report and Written Opinion of the International Searching Authority issued on Patent Application No. PCT/EP2013/053611 on Jun. 19, 2013.

* cited by examiner

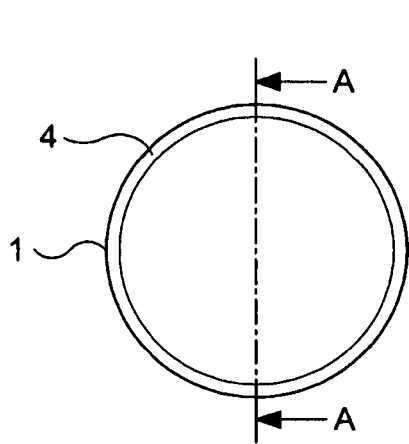
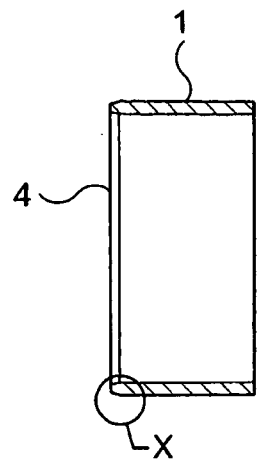
Fig. 4a         Fig. 4b
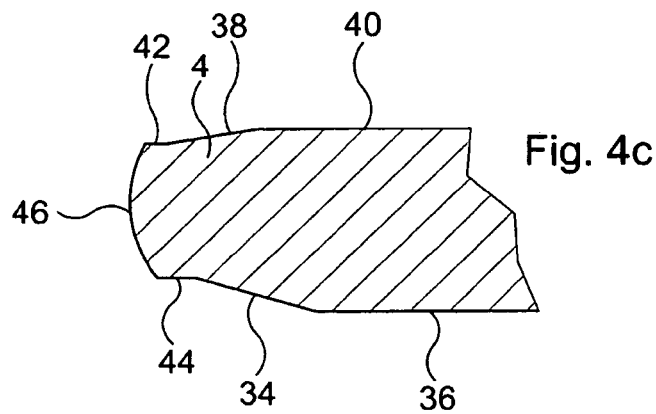
Fig. 4c
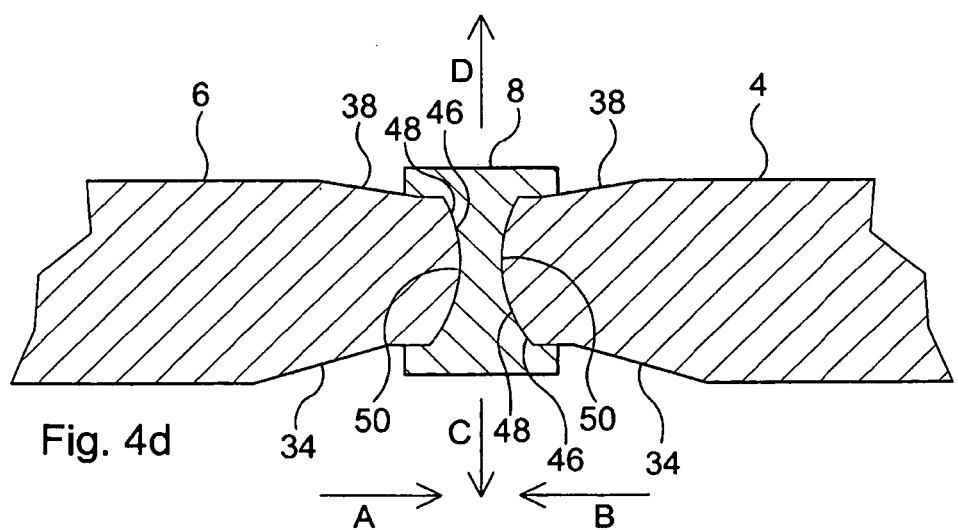
Fig. 4d

METHOD AND MACHINE FOR FORGE WELDING OF TUBULAR ARTICLES AND EXOTHERMIC FLUX MIXTURE AND METHOD OF MANUFACTURING AN EXOTHERMIC FLUX MIXTURE

FIELD OF THE INVENTION

The present invention relates to methods, apparatus and exothermic mixture compositions for use in forge welding operations, in particular for forge welding tubes together.

BACKGROUND TO THE INVENTION

In the hydrocarbons (oil and gas) recovery industry, pipes can be connected by two threaded male and female unions which are designed and manufactured in accordance with the specifications defined in the American Petroleum Institute (API). This type of joint is also referred to as a "pin" and a "box" connection. The helical threaded joint engaging the two pipe sections defines a helical path through which fluid from the pipe section may leak.

Leakage is not acceptable in most situations for economical, environmental and safety reasons. In order to seal this helical path of potential leakage, pipe dope has been commonly used to coat the threads, a practice that is well known in the industry.

However, pipe dope alone can be inadequate to achieve fluid-tight sealing and some type of secondary O-ring seal is normally required. The secondary O-ring seal is usually placed in an annular recess in one of the box sections. When the pin and box are made up, the secondary seal is deformed between corresponding surfaces of the pin/box joint to achieve a good seal. The secondary seal ring can be made of polymeric or metallic materials.

Another type of metal-to-metal seal is the so called premium connection which employs tapered threads contoured in such a way that the mating threads always form a stressed metal-to-metal, circumferentially continuous, seal. Although this type of connection is better than other types, it requires a relatively high tolerance in machining and is more expensive.

Premium and conventional threaded connections have larger diameter than the body of a pipe (such as a casing used in oil well drilling operations), and hence a larger diameter hole must be drilled to run e.g. casings with threaded pipes. Larger diameter wells are slower to drill and therefore more expensive. Threaded connections are in general not as strong as the steel casing, so a threaded connection cannot withstand the same mechanical stresses as a casing (pipe) itself.

The hydrocarbon recovery industry has been experiencing steady increases in the cost of production due to having to retrieve hydrocarbons from deeper wells, harder rock formations and harsher environments. Deeper wells require more casing strings (pipe sections lining the hole), and therefore the hole diameter drilled is larger with threaded connections than if flush connections are used. Also, more complex geology often means harder drilling environments, and increased stresses on the casing whilst running in the drill hole. Threaded connections are often the weakest part of a drill string, and can prevent casings being rotated whilst running in hole due to the limited ability to withstand torque stresses of the threaded connection.

New technologies, such as expandable tubulars have been developed to reduce the loss of tubing diameter with depth that occurs in conventional drilling procedures. The technology involves forcing a tool down pipe sections to expand the diameter and thus allow more flow.

However, neither threaded nor premium connections work well for this type of application since they may lose sealing integrity, or even fail during the expansion operation.

On the other hand, traditional liquid welding techniques are also problematic as they may create weak spots/sections that could fail during the expansion operation due to inhomogeneous microstructures in the welds produced. In order to overcome this problem, forge welding has been proposed. Since forge welding is a solid joining process, it has the potential to generate more uniform microstructures in a weld thus is more suitable for expandable tubular technology.

Forge welding is a solid-state welding process that joins metallic structures by first heating the two faying sections to a high temperature, typically 50-90% of the melting temperature, then by the application of a forge force, followed by a controlled cooling or post weld heat treatment. Since this technique has the potential to generate high quality flush welds having more uniform microstructure and properties, it has been proposed for welding steel tubulars for well casings as well as for offshore pipeline construction, and for joining coil tubing.

Application of this technique to the joining of API tubulars is described for example in U.S. Pat. Nos. 4,566,625, 5,721,413 by Moe and U.S. Pat. Nos. 7,181,821, 7,774,917 by Anderson et al, and US Patent Application Publication No. 2011/0168693 by Rudd et al.

A typical tube or pipe forge welding operation begins at first by end profiling and cleaning to minimize the rust on pipe ends. Next, the tubes are loaded into a chamber which is then evacuated and then back filled with an inert gas. After the chamber has achieved the required conditions (e.g., pre-defined oxygen and water vapour levels), the tube ends are heated to the desired temperature (e.g., >1200° C.) with the protection of a so called shielded active gas (SAG) used to avoid oxidation at the joint being made. A force is then applied to the softened tube ends, forcing them together, to achieve forge welding. Depending on the steel types, forge temperature, and heating uniformity, the microstructures generated by these forge welding procedures may neither be ideal nor uniform, hence a post weld heat treatment is carried out. This may consist of allowing the steel to cool naturally, or by controlling the rate at which the steel cools, or by cooling the steel very quickly and then reheating it to relax the microstructure.

In order to achieve high quality welds the tube ends should be clean and oxide free. In addition the atmosphere in the forging chamber should contain minimum oxygen and water vapour content. Use is made of an SAG such as hydrogen/nitrogen mixture a reducing atmosphere with the intent of preventing new iron oxide formation during welding, but also to reduce residual iron oxide which are often present, even after careful cleaning procedures.

In practice, it usually is very difficult to achieve an oxygen and moisture free atmosphere and metal oxide free tube ends within a reasonable time span. Thus, a high quality forge weld cannot be guaranteed for every weld.

Moreover whilst pipes made of carbon steels, which have iron oxide and/or hydroxide as the predominant contaminant can be joined successfully with these prior art (SAG forge welding) techniques other steel grades, those containing more stable metal oxides such as chromium oxide are more problematic. It is more difficult to remove such oxides by reduction with e.g. hydrogen unless higher temperatures and longer times are used.

Thus there is a need for further improvements in forge welding techniques.

DESCRIPTION OF THE INVENTION

According to a first aspect the present invention provides a method of forge welding comprising:
placing at least two components for welding together adjacent each other with an exothermic flux mixture placed therebetween; heating the exothermic flux mixture to initiate an exothermic reaction; and
pressing the faying surfaces of the two components together.

The method described herein is of particular use in forge welding tubular components or pipes. For example "API" pipes made in a wide range of different steels for use in the oil and gas industries. However, the technique may also be used for forge welding of other articles.

The method may also include applying external heating to the joint being prepared, to assist in reaching the desired forge welding temperature for joining the components.

The method may include a controlled cooling procedure following the joining of the components and/or a post welding heat treatment procedure. This can improve the quality of the forge welded join between the components.

If desired, (e.g. for safety reasons) the method may also include carrying out the procedure in a chamber filled with an inert gas atmosphere or alternatively in an atmosphere containing an active gas, such as hydrogen or CO, as is generally required for prior art forge welding methods.

However the methods making use of an exothermic flux mixture as described herein can allow a forge welding to be carried out without a special atmosphere, i.e. in the air. This can provide a substantial advantage, over the prior art, as welding may be achieved without the provision of inert gas, a chamber for containing the inert/active gas and (typically) a vacuum pump for evacuating the chamber before filling with an inert gas or active gas mixture. Thus the methods described herein are particularly suited for welding operations 'in the field', for example in oil field well construction or pipeline construction operations. The methods can also be more economic than prior art requiring an inert gas or active gas mixture and the associated equipment.

Typically the method will be carried out by placing an appropriately shaped solid unit (piece) of exothermic flux mixture between two components to be joined. Typically the components may be pipe sections which will have ends that are profiled to form a good fit with each other during the welding procedure. Profiling may be carried out by machining the ends of the parts being joined e.g. pipe ends, into specific shape and profile.

An appropriate heating rate and temperature associated with the said profiles may be determined by experiment, together with knowledge of the characteristics of the metal being joined. Where pipes are being joined, the two pipe ends are advantageously machined into convex (radial male shape) profiles with the same or slightly different curvatures. The ends of the pipe walls, when viewed in cross section have the convex (radial male shape) profile. Other profiles can usefully be employed as discussed hereafter. Either induction or Joule heating (direct current passed through a pair or multiple pairs of electrodes) methods can be used with pre-determined heating profiles.

The heating is continued (e.g. to 700-1200° C.) at least until the exothermic flux mixture reacts, forming molten flux liquid. The molten flux coats and cleans the pipe ends by dissolving the oxides on the two pipe ends efficiently. The exothermic fluxes described herein have the advantage over traditional (non exothermic) flux in that the dissolution rate of the metal oxides coating pipe ends is increased with raised temperature. The high temperature produced during by the exothermic chemical reactions occurring in the exothermic flux gives a substantially increased rate of dissolution. A further advantage is that the exothermic fluxes also heat and soften a thin layer of the faying surfaces, thus less heat is required from external heating and less forge force is required to achieve a good quality weld.

A forge force is applied, squeezing out the molten flux between the components (e.g. pipe ends), and to achieve high quality welding between the faying surfaces. Since the exothermic flux mixture is selected to produce a molten flux liquid that is, or is substantially, glassy in behaviour and has a lower coefficient of thermal expansion than for example steel components being joined, most of the flux spalls off during the cooling process after forging. Any remaining flux portion adhering to the joint can readily be cleaned off by abrasion and/or vibration treatment. Depending on the type of material (metal) being forged, a post weld heat treatment may be required or may be desirable to achieve a welded joint of the required quality.

Typically the method employed will also include a testing procedure to ensure the joint is of acceptable quality. For example a non-destructive test method can be carried out such as using a series of electromagnetic acoustic transducer (EMAT) assemblies to check for the weld quality, or the weld can be checked using X-rays. Other non-destructive testing techniques may be used.

According to a second aspect the present invention provides an exothermic flux mixture for carrying out the method of forge welding according to the first aspect of the invention. The exothermic flux mixture may also find use in other welding procedures. The exothermic flux mixture is conveniently provided for use as a solid unit, typically made by pressing a mixture of powdered components together as described below.

The exothermic flux mixtures may comprise various metal oxides, with typically one or more transition metal or other oxides, boron oxide, and halides, for example one or more fluorides and/or chlorides. The mixture is provided with a fuel, reactive with the oxides to produce an exotherm. The fuel may comprise elements or mixtures of elements selected from the group consisting of aluminium, silicon, calcium, magnesium, titanium, (or other metal that can react with the transition metal oxides), mixtures of two or more of these elements and alloys comprising two or more of these elements. Calcium-aluminum (Ca—Al) alloys can provide useful fuels, either as the sole fuel or as one of the fuels employed in the mixture. Ca—Al alloys containing 10-50 wt % Al are preferred. Ca—Al alloys with higher that 50 wt % Al may generate too high a quantity of oxides in the flux, resulting in a high melting temperature. This may lead to reduced protection of the pipe faying surfaces during welding due to reduced fluidity of the molten flux. Alloys with lower than 10 wt % Al can be difficult to crush into powder for preparing the exothermic flux and they are more susceptible to moisture attack.

The preferred exothermic mixtures typically contain (by weight) 20-50% transition metal oxide, 10-25% fuels, 10-60% boron oxide, and 0-50% fluorides and/or chlorides. The mixture may also include 0 to 30% of other oxides. Typically the components are provided as fine powders.

These compositions can exhibit an ignition temperature (the temperature that the exothermic reaction becomes self-sustaining) between 600° C. and 800° C., a combustion temperature (maximum temperature reached during the exothermic reaction) between 1200° C. and 2200° C., and a viscosity that can coat pipe ends well without running off. After the exothermic reaction, such mixtures form a molten flux typically containing (by weight) 10-30% basic oxides (e.g. calcium oxide, magnesium oxide etc) 2-20% aluminum oxide, 10-60% boron oxide, 0-30% liquid metals and 0-50% fluorides and/or chlorides. The molten flux is squeezed out during the forge welding process.

Examples of transition metal oxides include but are not limited to oxides of iron, manganese, nickel, copper, cobalt, titanium, molybdenum, and chromium. For welding API steel tubulars, it is preferable to use iron oxide, nickel oxide, chromium oxide, and/or manganese oxides as the transition metal oxides.

Other oxides that may be included are certain basic oxides that act as glass network modifier, hence can reduce the viscosity of the molten flux thus assisting in the flow and coating of the pipe surfaces for cleaning and protection. They include but are not limited to alkali metal oxides such as lithium oxide, sodium oxide or potassium oxide, alkaline earth metal oxides such as barium oxide, calcium oxide, or magnesium oxide. In some examples a transition metal oxide such as iron (II) oxide and/or manganese (II) oxide may also function as glass network modifier. Silicon dioxide and other oxides of silicon such as silicates e.g. sodium silicate may also be used as glass formers as discussed below.

Boron oxide is advantageously employed in the mixture as an agent to assist glass formation or glass type behaviour in the flux mixture when molten. It also acts as a binder in the mixture since it can be partially or totally melted at a low temperature. Thus a strong preform shape or unit of exothermic flux material, such as a ring can be manufactured. Thus a preform shape or unit can be made stronger by heating (e.g. at <500° C.) without causing substantial reaction leading to the ignition of the exothermic flux.

Silicon oxides can also be usefully employed in the mixture to act as glass forming agent and also to increase the viscosity of the molten flux in some cases. Silicon dioxide or other oxides such as silicates can be introduced into the mixture by various means. For example when using silicon as a fuel it reduces the transition metal oxides in the mixture. Alternatively or additionally silicon dioxide or other silicon containing compounds such as sodium silicate may be employed as a component in the mixture.

Halides such as fluorides and/or chlorides employed in the flux mixtures include but are not limited to those of alkali metals, such as those of potassium, lithium and sodium, Alkaline earth metal halides such as fluorides and/or chlorides of barium, calcium, magnesium, and strontium may also be employed.

Other halides such as fluorides and/or chlorides of aluminum, may also be employed.

Alkaline earth metal fluorides are preferred for highly exothermic mixtures, i.e., those mixtures that can generate a relatively high combustion temperature (i.e. the maximum temperature reached during the exothermic reaction), e.g., >2000° C. since these fluorides have a high boiling point. For weakly exothermic mixtures, fluorides and/or chlorides with a lower boiling point may be used.

When a mixture of fluorides and/or chlorides is used, it is preferable to select the relative amount of each fluoride and/or chloride to be such that they form a low melting point eutectic composition. In situations where a fast reaction is desired, it is advantageous to use a pre-melted eutectic composition of such fluorides and/or chlorides when preparing the exothermic flux mixture. The pre-melted eutectic halide mixture is prepared by first melting the individual halide components together. This molten mixture is then cooled and then powdered for inclusion in the exothermic flux mixture.

In addition to the fuel and transition metal oxide required for the exothermic reaction, the exothermic mixtures advantageously contain an optimized combination of a glass former (e.g., boron oxide, silicon dioxide), glass network modifier (e.g., basic oxides that may or may not be a transition metal oxide), one or more fluorides, and/or chlorides).

Each of the components in the exothermic mixture is advantageously provided in fine powder form for efficient, intimate mixing. The particle size of all powders may be between 325 mesh (45 µm) and 60 mesh (250 µm). Powders with a particle size larger than 60 mesh tend to have a too long ignition and too slow reaction rate, while those smaller than 325 mesh are more costly and may be too sensitive to moisture attack. This is particularly the case for fuels containing calcium. In general the selection of different particle size provides a means to control the ignition and reaction rate of the exothermic mixture.

The composition of the mixture is adjusted to achieve the desired combination of basicity, reactivity, ignitability, and viscosity suited to the components e.g. types of the API steel pipes that are being welded. For example, exothermic mixtures for welding stainless steel pipes differ from those welding carbon steel pipes in term of compositions, ignition temperature, and combustion temperature since fluxes for dissolving chromium oxide (on the surface of stainless steels) may be different from those for dissolving iron oxides or hydroxide (on carbon steels).

Welding of stainless steels can be accomplished by using more aggressive flux mixtures, for example utilizing more exothermic mixtures which release a higher thermal energy and/or contain a higher amount of fluorides and/or chlorides and/or oxides that can dissolve chromium oxide more effectively.

These mixtures typically exhibit an ignition temperature (the temperature that the exothermic reaction becomes self-sustaining) of between 600° C. and 800° C., a combustion temperature between 1200° C. and 2200° C., and exhibit a viscosity that can coat pipe ends well without running off.

According to a third aspect of the current invention there is provided a method for manufacture of an exothermic flux mixture unit, for use in forge welding. These solid units are generally prepared by mixing finely divided powders of the components together and then pressing the resulting mixture in a mould to produce a so called "green" or unreacted solid flux mixture unit in the shape desired for carrying out the intended forge welding procedure.

For example, for use in forge welding tubes together the units are moulded in the form of exothermic flux rings. The flux rings are sized to suit the diameter of the tubes being joined. The flux rings are made of reactant powders of the constituent oxides, fuels, and fluorides and/or chlorides that are first mixed well by traditional mixing techniques such as tumbling, ball milling, and so on, preferably in a moisture free inert atmosphere. The well mixed reactant mixture is then pressed uniaxially inside a die to form a ring shaped green form with the designed end profile and a green density in the range of 50-80% of its theoretical mixture density.

Advantageously, the ring or other solid unit is then heat treated after pressing, for example at a temperature of 400-500° C. for 2-30 minutes or even 450-500° C. for 2-20 minutes. Alternatively heating may also be carried out during pressing. Specific heat treatment temperature and time depends on the composition, mass and size of the ring or other solid unit being prepared. Generally speaking, a ring with any one or more of higher mass, larger ring size, and lower boron oxide content, requires a higher heat treatment temperature and longer heating time to produce the best results. The heat treatment is designed to melt the boron oxide fully or partially depending on the amount of boron oxide in the mixture, which can increase the mechanical strength of the ring, allowing for easier handling. The same principles apply to solid units other than rings. Heat treated solid units have been shown to exhibit improved resistance to breaking up, even when subject to some moderate mechanical abuse.

Typically the flux ring will be shaped to conform closely to pipe ends being joined. The pipe ends may have various shapes for different applications, including a radial male shape, a radial female shape and other shapes with a receptacle to contain the molten flux. Viewed in cross section the pipe wall has a male shape; or a female shape or other shape with a receptacle to contain the molten flux. Advantageously at least one of the pipe ends being joined has a profile, of its wall (viewed in cross section), that slopes backwards, (away from the extreme end of the pipe), from the inside of the pipe wall at its end, towards the outside of the pipe wall, to guide the molten flux and any impurities away from the bond line to the outside of the pipe. For example the end of the pipe wall may be bevelled back from its inside surface to its outside surface.

Where a radial female shape is employed on one pipe end a corresponding male shape that fits into the female shape is employed. If a female profile is used with a concave cavity that accepts a corresponding convex profiled male shape, the radius of the female curvature should be larger than the radius of the corresponding male end. This allows all flux and contaminants to have a pathway to exit the weld upon application of the forging force. In the case of vertical forging as described hereafter, the female profile is advantageously utilized on the lower pipe so as to benefit from gravity to assist in maintaining a pool of molten flux.

The pipe ends may be profiled not only to provide good contact with each other during the forge welding process but also to allow for the change in profile made by the application of the forge force and the heat provided to the system. For example the pipe ends may be reduced in thickness (e.g. bevelled) in preparation for joining as the forge force will compress the heat softened pipe ends together, causing a thickening at the join. By choice of profile, readily determined by experiment, a given pipe type and size can be forge welded together by the method of the invention to produce a smooth or substantially smooth join, without requiring substantial post joining removal of excess pipe material.

Joining pipes with smooth connections, not of greater diameter than the pipes themselves can have notable advantages. For example in oil well drilling operations, smooth pipe connections can allow use of larger diameter pipes at greater drilling depth in comparison with conventional systems where the joins between pipe sections are of greater diameter than the pipes employed.

The method of forge welding described herein may be carried out in a forge welding machine that may be automated or semi-automated. For example where two pipe ends are being welded together a forge welding machine may comprise: a jig for holding pipes in position with the ends to be welded aligned and in close proximity; means for igniting the exothermic flux mixture; means for supplying heating to the joint being produced or after it is produced; and means to advance at least one of the pipe ends towards the other, thereby applying a forge welding force. Typically the machine will have a controller, for example a microprocessor based controller, to control the various functions of the machine. The machine may also include other functionality, for example cooling means (such as a water supply) for post weld heat treatment, means to clean the join after it has been formed (such as a vibrator or abrading tool) and testing means (for example ultrasonic testing means such as are known in the art) to check the integrity of each weld made.

Although the present invention is for forge welding to be carried out in air, If desired (e.g., for certain safety regulations) the machine may also include a chamber in which the forge welding is carried out and means for supply of a selected gas or gas mixture to the chamber. The chamber may also be fitted with a vacuum pump to facilitate providing a selected atmosphere around the joint as it is formed.

The method, especially but not exclusively when a forge welding machine is employed, may include a programmed slow moving of e.g. two pipe ends toward each other during heating. For example both pipe ends may be moved towards each other at the same speed when an induction coil located at the joining point is employed to provide heating to the pipes and ignition of the exothermic flux mixture.

Moving both pipe ends into a heating zone (provided by e.g. an induction coil) at the same speed assists in heating both pipe ends uniformly. However this has the disadvantage that means for moving both pipes simultaneously are required. As an alternative the first pipe is held fixed and the second is advanced towards the first. In such a situation, the heating induction coil may move simultaneously with the moving pipe to maintain uniform heating.

The movement is typically started both before the ignition of the exothermic flux mixture placed between the pipe ends and during and after the point where flux ring becomes softened by heat. The movement starts after reaching the softening temperature of the exothermic mixture, which typically occurs at about 500-550° C., for exothermic mixtures of the invention.

Advantageously the pipe ends are initially moved towards each other at a relatively low speed, for example about 4 mm per minute, before ignition starts, typically in the temperature range of 500-600° C. or even 500-650° C. The rate of motion will typically be increased, for example to 10-60 mm per minute after the exothermic ring has been ignited, typically when the temperature is about 600-800° C. or even 600-1000° C. This advancing together of the pipe ends is continued to ensure good coating of the flux onto the pipe surfaces as well as to subsequently squeeze the molten flux out as the pipes are forced together and finally to apply the desired (typically pre-programmed) forge force. To avoid possible damage to the ring of exothermic flux the overall moving distance before ignition should generally not be more than about 20% of the ring height.

In a typical procedure the movement of the two pipes is selected such that when the movement, before the application of the forging force, is complete, a gap of 1-3 mm is left between the two pipe ends. The forging movement is then applied, moving the pipe ends into contact and forcing them together to obtain a forged weld.

In a convenient arrangement pipes are joined together when the ends are positioned with one vertically above the other i.e. vertical forging is employed. For example in a forge welding machine one, lower pipe has an exothermic flux ring placed on top of its end. A second, upper pipe is positioned above the end of the lower pipe and with its respective end in alignment. An induction coil or other heating means is then applied to ignite the exothermic flux ring and the upper pipe is lowered onto the lower pipe in a controlled fashion and including the application of the forge force when the correct temperature conditions have been achieved.

Two pipes may also be welded together by the methods described herein, when in a horizontal orientation or at any other chosen angle.

BRIEF DESCRIPTION OF THE DRAWINGS

Further features and advantages of the present invention will appear from the following detailed description of some embodiments illustrated with reference to the accompanying drawings in which:

FIGS. 4a to 4d show profiled pipe ends being joined by forge welding using an exothermic flux ring;

DESCRIPTION OF SOME PREFERRED EMBODIMENTS AND EXPERIMENTAL RESULTS

The following examples illustrate the exothermic mixtures and the preparation of exothermic rings, for joining pipes, using the mixtures; however they should not be regarded as limiting.

Example 1

Figure 3:
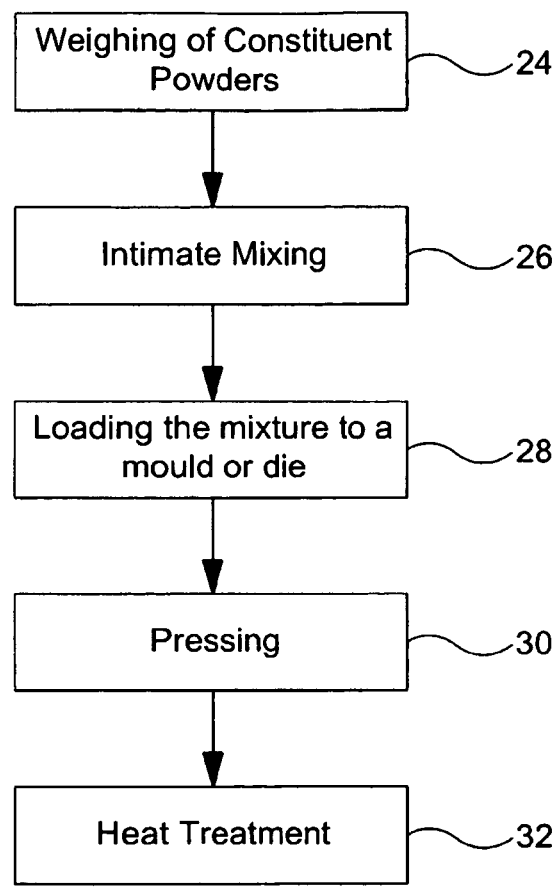
FIG. 3 is a flow chart showing the steps to manufacture an exothermic ring.

An exothermic flux ring is prepared (as illustrated in FIG. 3, discussed below) using a mixture of (wt %) 31.9% Iron (Ill) Oxide, 6.0% Calcium, 8.1% Aluminum, 9.7% Sodium fluoride, 6.5% Aluminum fluoride, and 37.8% boron oxide.

First, the exothermic mixture was prepared by weighing the constituent powders according to the ratios stated above. The powders were then mixed thoroughly by traditional powder mixing techniques such as tumbling or ball milling. About 6 grams of the intimately mixed mixture of reactant powders is then pressed in a die having two plungers with convex profiles to produce a green pre-form with about 60% of the theoretical density and having concave grooves for receiving pipe ends as described hereafter and with reference to FIG. 4, forming an exothermic flux ring having dimensions of about 50 mm outside diameter, 5 mm wall thickness and 4 mm height. The green pre-form ring was then heat treated at 460° C. for 2 minutes and then allowed to cool naturally.

The heat treated pre-form with, for example a height of about 4 mm is then placed between two steel pipes with convex profiled ends. The steel pipe ends are heated by induction. Upon reaching a temperature of approximately 750 C, the pre-form ignites with the reaction generating heat (calculated adiabatic combustion temperature of 1600K without accounting for the pre-heat) and producing molten product materials containing calcium, aluminum, and boron oxides, sodium and aluminum fluorides, iron metal, and compounds thereof. The high temperature product materials provide heat to the surface of the pipe ends and rapidly dissolve surface oxides and protect from new oxidation. The pipes are then moved together a total of 8 mm (4 mm to account for the starting 4 mm gap and 4 mm of forging distance. The molten flux is squeezed out and the pipes fuse to form a weld.

Example 2

An exothermic flux ring is prepared (as illustrated in FIG. 3) using a mixture of (wt %) 23.5% Iron (Ill) oxide, 9.3% Nickel oxide, 13.9% Calcium, 3.9% Aluminum, 5.4% Barium fluoride, 9.6% Calcium fluoride, 9.6% Magnesium fluoride, and 24.8% Boron oxide. In this example the fluorides were pre-melted together and the resultant fluoride mixture cooled and then powdered to form a mixed fluoride component for the flux ring mixture. The exothermic mixture was then prepared by weighing the constituent powders according to the ratios stated above. They were then mixed thoroughly by traditional powder mixing techniques such as tumbling or ball milling. About 6 grams of the intimately mixed mixture of reactant powders is then pressed in a die having two plungers with convex profiles to produce a green form with about 60% of theoretical density, with dimensions of about 50 mm outside diameter, 5 mm wall thickness and 4 mm height. The green pre-form was then heat treated at 460° C. for 4 minutes followed by natural cooling. The pre-form with a height of 4 mm is then placed between two steel pipes with convex profiled ends. The steel pipe ends are heated by induction. Upon reaching a temperature of approximately 750° C., the pre-form is ignited with the reaction generating heat (calculated adiabatic combustion temperature of 1700K without accounting for the pre-heat) and product materials containing calcium, aluminum, and boron oxides, barium, calcium, and magnesium fluorides, iron and nickel metals, and compounds thereof. The high temperature product materials provide heat to the surface of the pipe ends and rapidly dissolve surface oxides and protect from new oxidation. The pipes are then moved together a total of 8 mm (4 mm to account for the starting 4 mm gap and 4 mm of forging distance. The molten flux is squeezed out and the pipes fuse to form a weld.

In Examples 1 and 2, iron (III) and nickel oxide were used as the oxygen source, and calcium and aluminum were used as the fuels for the exothermic reactions. Other transition metal oxides, such as iron (II,III) oxide, manganese oxides, copper oxides, molybdenum oxides, etc. can also be used as the oxygen source. In addition, instead of elemental calcium and aluminum other fuels such as magnesium, silicon, or other metals may also be used. Moreover, alloys of these metals may also be used as fuels.

Example 3

An exothermic flux ring is prepared (as illustrated in FIG. 3, discussed below) using a mixture of (wt %) 36.2% Manganese (IV) Oxide, 14.2% Calcium-Aluminum alloy (containing 25%, by weight, of aluminum), 8.0% barium fluoride, 1.6% calcium fluoride, 1.5% magnesium fluoride, and 38.5% boron oxide.

First, the exothermic mixture was prepared by weighing the constituent powders according to the ratios stated above. The powders were then mixed thoroughly by traditional powder mixing techniques such as tumbling or ball milling. About 75 grams of the intimately mixed mixture of reactant powders is then pressed in a die having two plungers with convex profiles to produce a green pre-form with about 60% of the theoretical density and having concave grooves for receiving pipe ends as described hereafter and with reference to FIG. 4, forming an exothermic flux ring having dimensions of about 248 mm outside diameter, 11 mm wall thickness and 3.5 mm height. The green pre-form ring was then heat treated at 450° C. for 30 minutes and then allowed to cool naturally.

The heat treated pre-form with, for example a height of about 3.5 mm is then placed between two steel pipes with convex (male) profiled ends. The steel pipe ends are heated by induction. Upon reaching a temperature of approximately 750 C, the pre-form ignites with the reaction generating heat (calculated adiabatic combustion temperature of 1800K without accounting of pre-heat) and producing molten product materials containing calcium, aluminum, manganese and boron oxides, barium, calcium and magnesium fluorides, manganese metal. The high temperature product materials provide heat to the surface of the pipe ends and rapidly dissolve surface oxides and protect from new oxidation. The pipes are then moved together a total of 8 mm (4 mm to account for the starting 4 mm gap and 4 mm of forging distance. The molten flux is squeezed out and the pipes fuse to form a weld.

A calcium-aluminum alloy containing 25 wt % aluminium is used in Example 3. However other Ca—Al alloys containing from 10-50 wt % Al may be used.

The method of forge welding as applied to pipe sections is illustrated schematically in FIGS. 1a to 1f.

Figure 1A:
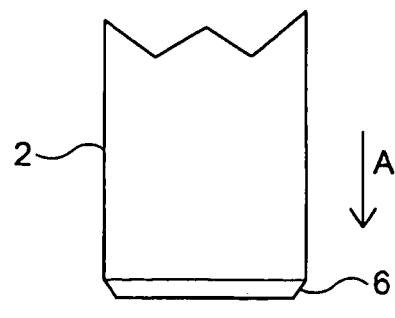
FIGS. 1a to 1f illustrate forge welding of tubes with an exothermic flux ring.
Figure 1A:
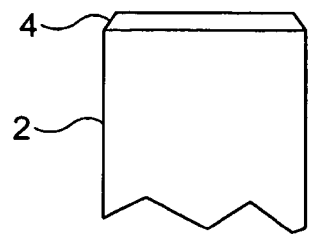

In FIG. 1a two pipe sections 1 and 2 are shown in partial elevation. Both pipe sections 1, 2 have profiled ends 4, 6, (bevelled in this example). The lower pipe section 1 is held in a jig (not shown) and has an exothermic flux ring 8 (not shown in this figure but see FIG. 1b) located on top of end 4. Pipe section 2 is located above and in alignment with pipe section 1, by means of an appropriate jig.

An induction heating coil (not shown, for clarity) is located around the pipe ends 4,6 and exothermic flux ring 8. Heating by use of the induction coil ignites the flux ring 8 and the upper pipe section 2 is advanced as indicated by arrow A downwards to squeeze out the molten flux formed from the flux ring 8. The molten flux cleans the pipe ends 4,6 removing oxides from their surfaces and preventing ingress of oxygen or air.

The process is continued until the pipe sections contact at 12 as shown in FIG. 1 c. At this stage the molten flux has been driven out from between the contacting pipe surfaces, and the temperature is suitable for forge welding (about 800 to 1200° C. typically). Motion A is continued to provide a forging force between pipe sections 1,2 as suggested by arrow B in opposition to arrow A; and arrow C indicating the outwards direction of softened pipe material from the contact area 12. it will be appreciated that there may also be some inwards (towards the centre of the pipe) movement of material as the forge force is applied.

Figure 1F:
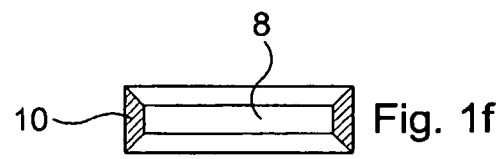
Figure 1B:
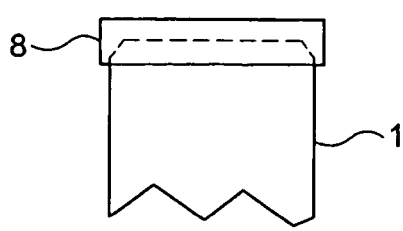
Figure 1E:
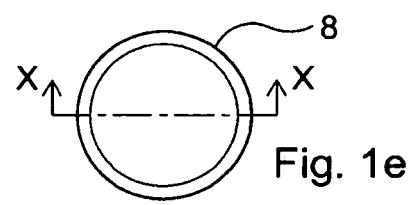
Figure 1C:
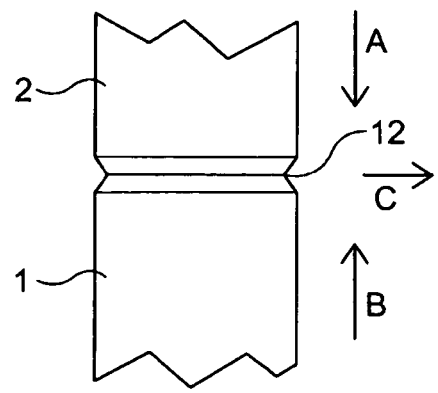
Figure 1D:
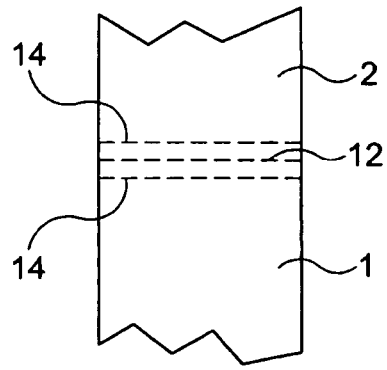

FIG. 1d shows the finished weld between pipe sections 1 and 2, indicated by dashed lines 14. By selection of appropriate pipe end profiling, size and type of exothermic flux ring and application of forge force, a smooth joint, requiring little post welding treatment (such as removal of remaining flux and or excess metal at the joint) may be produced. If required or desired the method may also include heating and cooling treatments following the initial welding step to improve the quality of the join.

FIG. 1e shows the exothermic flux ring 8 of FIG. 1b in plan view and the shape of the ring 8, to conform with the bevelled edges 4,6 is more clearly seen in cross section elevation along X-X (FIG. 1f). The cross section 10 of the ring 8 is shaped to fit about the bevelled pipe ends 4,6.

Figure 2:
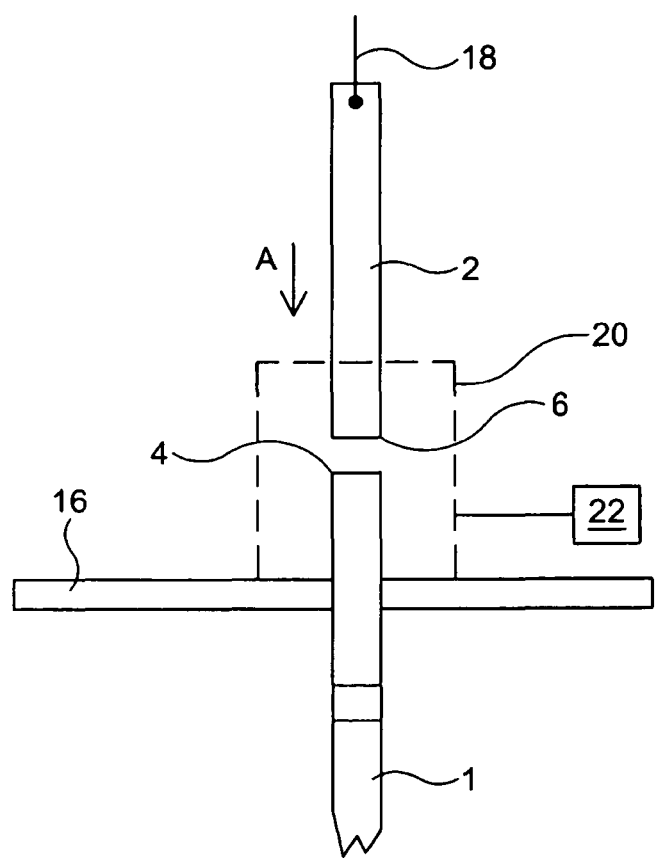
FIG. 2 illustrates forge welding of oilfield drilling pipes, in situ.

In FIG. 2 a process similar to that shown in FIG. 1 is illustrated schematically. An oil well drilling platform 16 has a drilling pipe 1 (drill string) extending downwards from it in the usual fashion. The pipe 1 requires another pipe section 2 to be fitted to allow drilling to greater depth to continue. (The drill driver etc will be conventional and are not shown in this illustration). The new pipe section 2 has been hoisted into position above pipe 1 (hoist indicated by line 18). The two pipes 1,2 to be joined are held a forge welding machine, not shown in detail but indicated by dashed line 20. The machine includes a jig or jigs to hold the pipe ends in position and to drive pipe 2 towards pipe 1 as required. The machine 20 also includes heating means (such as an induction coil) to heat pipe ends 4,6 and the exothermic flux ring employed (not shown). Cooling means such as water or gas may also be provided. The machine 20 may also have an integral ultrasonic or other non-destructive testing means fitted to test completed joins. A controller indicated schematically by box 22 controls the operation of machine 20. In use machine 20 carries out a forge welding process similar to that shown in FIG. 1. By this means rapid and secure joining of new pipe sections to the drill string may be achieved in drilling operations. Typical weld times achieved in testing may be from say 5 to 12 minutes, including the time to load a new pipe section into place and, following welding to become ready for drilling operations again.

FIG. 3 is a flow diagram illustrating the preparation of a solid unit of exothermic flux material, for example the flux rings discussed above in examples 1 and 2. The constituent powders are weighed 24 and then mixed intimately together 26. The intimate mixing is typically carried out by methods such as tumbling together in a suitable drum or other mixing vessel. Ball milling may also be employed. The mixture is then loaded into a suitable mould or dies 28 before being pressed 30 into the desired shape, such as a ring for use in joining pipes. The pressed solid unit, typically 50 to 80% of the theoretical density is then heat treated 32 to form the finished solid unit. The heat treatment 32 is designed to melt the boron oxide fully or partially depending on the amount of boron oxide in the mixture. This can increase the mechanical strength of the ring, allowing for easier handling.

FIG. 4 show schematically an example of profiling of pipe ends suitable for the forge welding procedures of the invention. FIG. 4a shows a pipe section 1 viewed looking at an end 4, which is profiled with a radial male shape ending in a convex curve.

The pipe section is shown in cross section, along line AA, in FIG. 4b with a magnified detail of the end 4 cross section surface (circled part X) shown in FIG. 4c. As can be seen in FIG. 4c the profile of pipe end 4 includes a bevelled portion 34 on outer wall 36 and a somewhat less bevelled portion 38 (of shallower angle and shorter length) on inner wall 40. The outer edge of the profile (the pipe wall viewed in cross section) of pipe end 4 is concluded by two parallel short portions 42, 44 and a convex end face 46.

When joining two pipe ends having the profiling of FIG. 4c, an exothermic flux ring 8 having two concave grooves 48 as shown in partial cross section FIG. 4d may be employed. The method proceeds as discussed above with reference to FIG. 1 or 2. On heating and ignition of exothermic flux ring 8 and appropriate advancing of the pipe ends 4 and 6 towards each other the convex end faces 46 will first contact each other at the outermost points 50 on their surfaces.

As the forge force (suggested by arrows A and B) is applied and the heat softened pipe ends 4,6 distort and fuse together the molten flux will be squeezed outwards from the forming joint and metal at the contact area will also tend to be forced outwards as suggested by arrows C and D, thickening the pipe walls at the forming joint. The bevelled portions 34 and 38 of the pipe ends will accommodate at least some of this thickening, mitigating or even preventing the joint from having a larger diameter than the original pipe diameter. After cooling and any heat treatment cycles applied to improve the quality of the joint are completed, the joint may be finished by cleaning or abrading as desired or required.

Figure 5A:
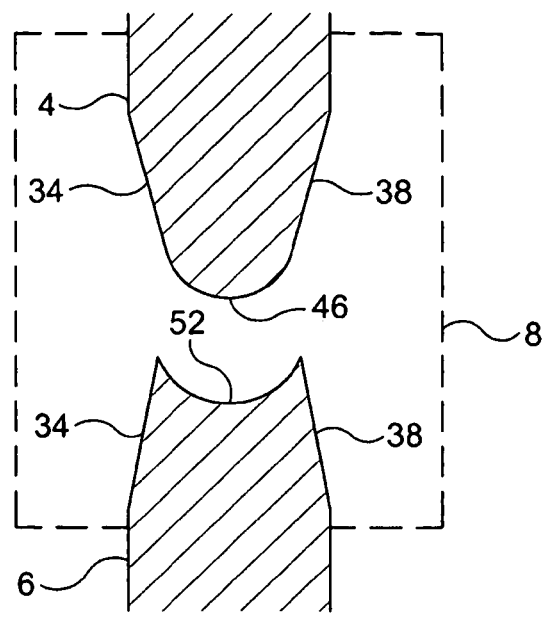
FIGS. 5a and 5b show joining two pipes having a male (convex) profiling on top and a female (concave) profiling on the bottom.
Figure 5B:
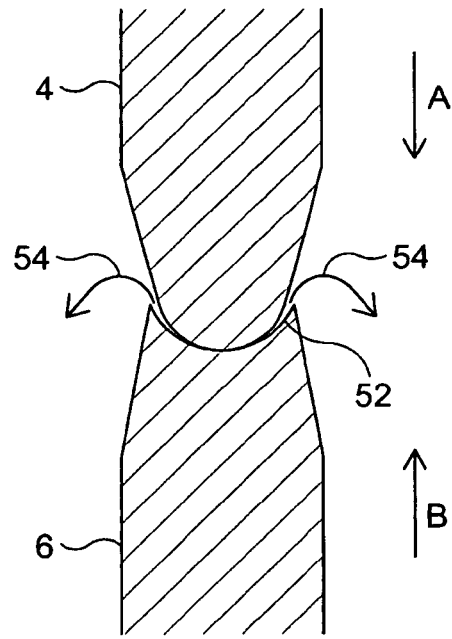

FIGS. 5a and 5b illustrate schematically another example of profiling of pipe ends suitable for the forge welding procedures of the invention. In this example a vertical forging operation is being carried out.

FIG. 5a shows the schematic partial cross section profile of two pipe ends 4 and 6 in a similar view to that of FIG. 4d. The upper pipe end 4 has a male radial shape, including bevels 34,38 and a convex end face 46 on its wall. The lower pipe end 6 has two bevels 34,38 and a female radial shape with a concave end face 52. An exothermic flux ring 8 is not shown in any detail but suggested by dashed line. The flux ring is formed to fit the profiles of the pipe ends as discussed before.

FIG. 5b the same two pipe ends 4,6 in similar partial cross section detail view to that of FIG. 5a but during a forge welding process after ignition of the exothermic flux ring and as the two ends 4,6 are being forced together by the forge force suggested by arrows A and B. Molten flux will tend to be retained in the concave end face 52 of the wall of lower pipe end 6, bathing the surfaces that are to be fused together in the molten flux, allowing more heat transfer and efficient cleaning of the metal surfaces.

The radius of the concave 52 profiling on the lower end 6 is larger than that of the convex profiling 46 on the upper end 6 to make sure the molten flux can be readily squeezed out in the subsequent forging operation as suggested by arrows 54.

Figure 6A:
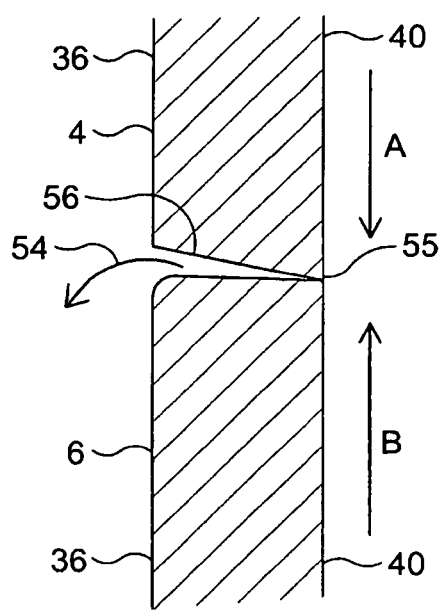
FIGS. 6a and 6b show joining of pipes making use of profiles that direct the molten flux to the outside.

FIG. 6a shows two pipe ends, 4,6 in similar partial cross section detail view to that of FIG. 5b. The pipe ends 4,6 are in contact as a forge force suggested by arrows A and B is being applied. In this example the upper of the two pipe ends 4 has a profile that slopes backwards, from the inside of the pipe wall 40 at its very end 55 towards the outside of the pipe wall 36, to guide the molten flux and any Impurities away from the bond line, where the join is made, to the outside of the pipe. This squeezing out of the molten flux is indicated by arrow 54. In this way the majority of the flux is directed to the outside of the pipe where removal of material adhering to the pipe after joining is easier. It will be appreciated that the profile employed in such embodiments of the invention need not be a flat bevel 56 sloping radially outwards as indicated in FIG. 6a but may have for example a convex curvature sloping backwards and away from the inside wall at the end of the pipe.

Figure 6B:
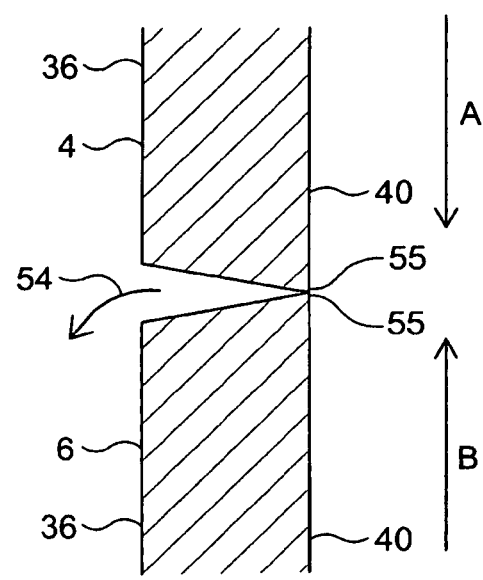

In FIG. 6b a view comparable to that of FIG. 6a is shown, but in this example both pipe ends 4,6 are profiled to direct (arrow 54) molten flux towards the outside wall 36 of the pipe as the forge force is applied.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of forge welding comprising:
    placing at least two components for welding together adjacent each other with an exothermic flux mixture placed there between, each component having a faying surface;
    heating the exothermic flux mixture to initiate an exothermic reaction, and melting the exothermic flux mixture to produce a molten flux; and
    pressing the faying surfaces of the two components together to squeeze out molten flux and to forge weld the faying surfaces together.

2. The method of claim 1 wherein the components being welded are tubular and the faying surfaces are ends of the tubes, in particular wherein the tubular components are pipes.

3. The method of claim 1 further comprising applying external heating to the joint being prepared.

4. The method of claim 1 further comprising at least one of a controlled cooling procedure and a post welding heat treatment.

5. The method of claim 1 further including carrying out the procedure in a chamber filled with an inert gas or an active gas.

6. The method of claim 1 wherein the procedure is carried out in air.

7. The method of claim 2 wherein two tubular components are welded and the end of at least one of the components being welded has its wall profiled into one of:
    a male radial shape, a female radial shape, and a profile that slopes backwards, away from an end of the tubular component at an inside wall of the tubular component, towards an outside of the wall of the tubular component.

8. The method of claim 7 wherein both of the tubular components have ends of the tubes that have walls of a male radial shape.

9. The method of claim 7 wherein one of the tubular components has an end with a wall of a male radial shape and the other has an end with a wall of a female radial shape.

10. The method of claim 9 wherein the wall end of a female radial shape has a concave cavity that accepts a corresponding convex profiled male shape of the wall end of the male radial shape; and wherein the radius of the female curvature is larger than the radius of the corresponding male end.

11. The method of claim 2 wherein two tubular components are being welded and the thickness of the walls of the components is reduced at the ends being welded.

12. The method of claim 2 wherein two tubular components are being welded, and wherein they are welded when in a vertical orientation.

13. The method of claim 1 wherein two components are being welded and they are moved towards each other in at least two pre-forge stages before pressing the faying surfaces together, the pre-forge stages including:
    a), a first movement before the ignition of the exothermic mixture; and
    b), a second movement, faster than the first movement, after the ignition of the exothermic flux.

14. The method of claim 13 wherein the two components are either:
    moved simultaneously towards each other; or
    one component is moved towards the other.

15. The method of claim 1 wherein the exothermic flux mixture placed between the two components is in the form of a shaped solid unit.

16. The method of claim 1 wherein the exothermic flux mixture comprises:
- a fuel selected from the group consisting of aluminium, silicon, calcium, magnesium, titanium, mixtures of two or more of these elements, and alloys comprising two or more of these elements;
- one or more transition metal oxides, boron oxide, and halides.

17. The method of claim 16 wherein the exothermic flux mixture has a composition by weight of 20-50% transition metal oxides, 10-25% fuel, 10-60% boron oxide, and 0-50% of fluorides and/or chlorides.

18. The method of claim 16 wherein the transition metal oxides are selected from the group consisting of oxides of iron, manganese, nickel, copper, cobalt, titanium, molybdenum, and chromium.

19. The method of claim 16 wherein the exothermic flux mixture further comprises up to 30% by weight of oxides selected from the group consisting of: alkali metal oxides, alkaline earth metal oxides, oxides of silicon, and combinations thereof.

20. The method of claim 16 wherein the exothermic flux mixture comprises Ca—Al alloy as sole or one of the fuels and the alloy contains from 10-50 wt % Al.

* * * * *